July 23, 1957 E. B. OFFUTT ET AL 2,800,397
METHOD AND APPARATUS FOR ANALYZING A REACTIVE GAS
Filed Aug. 18, 1953 8 Sheets-Sheet 1

INVENTORS
Elmer Bradley Offutt
BY Leonard V. Sorg.
Everett A. Johnson
Attorney.

July 23, 1957 E. B. OFFUTT ET AL 2,800,397
METHOD AND APPARATUS FOR ANALYZING A REACTIVE GAS
Filed Aug. 18, 1953 8 Sheets-Sheet 2

INVENTORS.
Elmer Bradley Offutt.
BY Leonard V. Sorg.
Everett A. Johnson
Attorney.

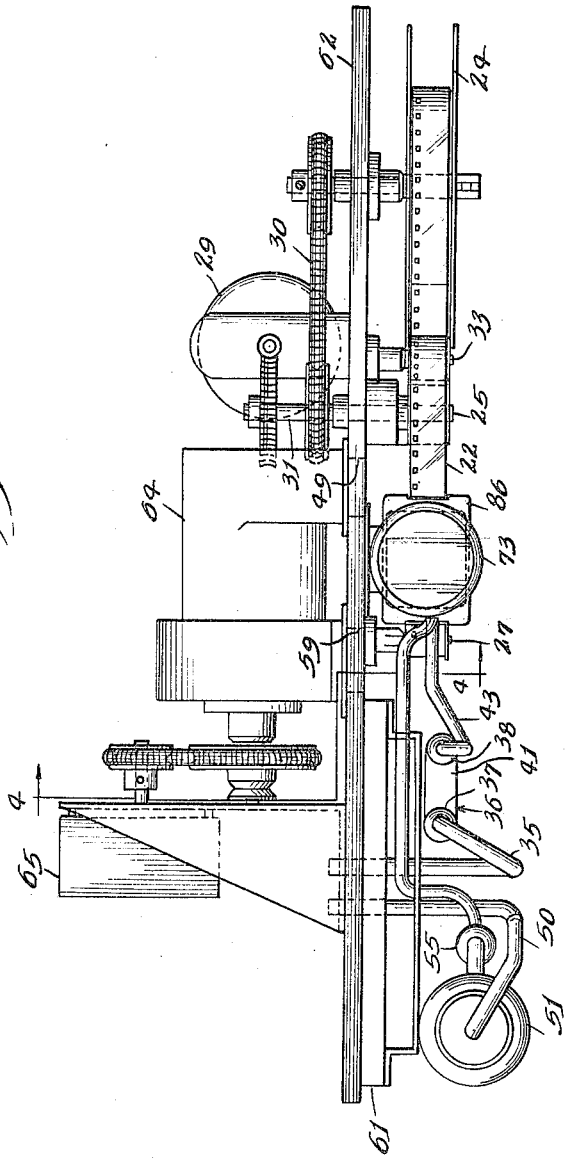

July 23, 1957 E. B. OFFUTT ET AL 2,800,397
METHOD AND APPARATUS FOR ANALYZING A REACTIVE GAS
Filed Aug. 18, 1953 8 Sheets-Sheet 4
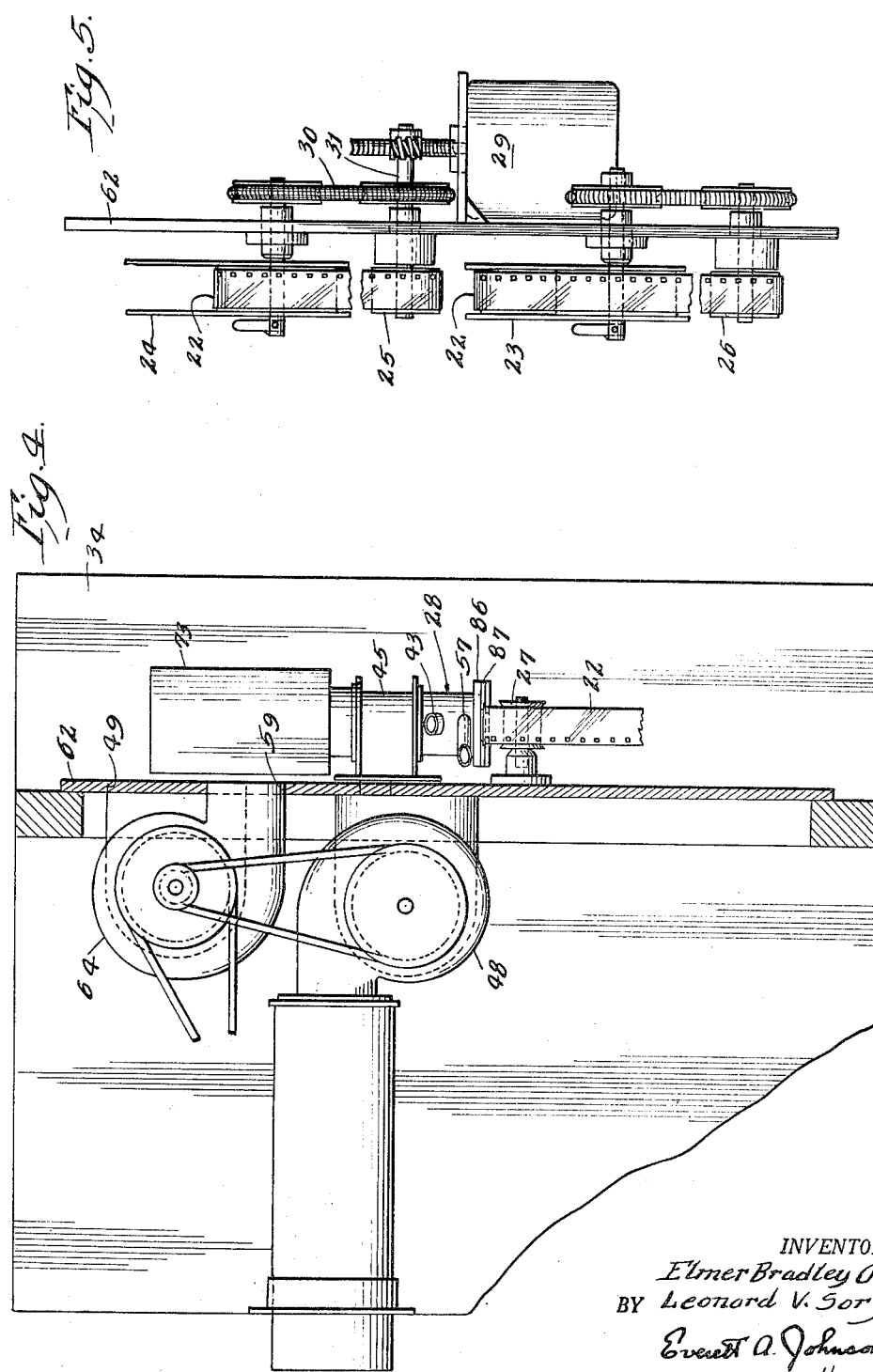
INVENTORS.
Elmer Bradley Offutt.
BY Leonard V. Sorg.
Everett A. Johnson
Attorney.

July 23, 1957 E. B. OFFUTT ET AL 2,800,397
METHOD AND APPARATUS FOR ANALYZING A REACTIVE GAS
Filed Aug. 18, 1953 8 Sheets-Sheet 5
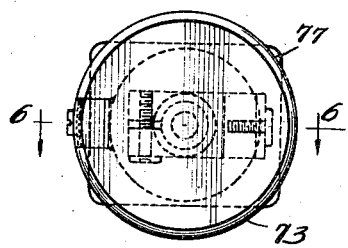
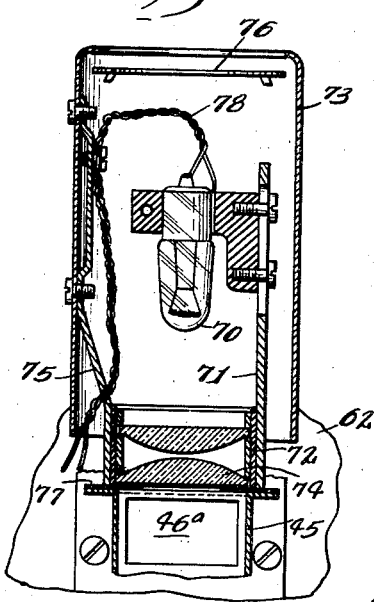
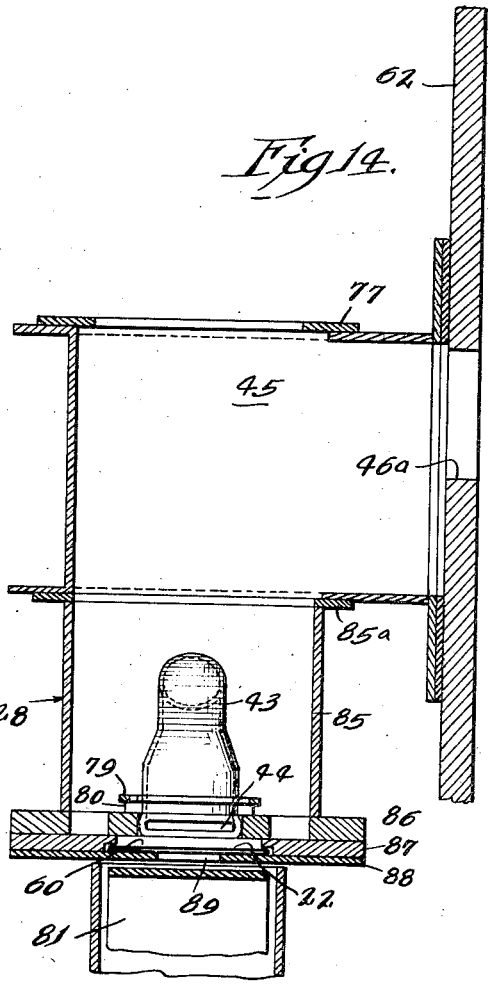
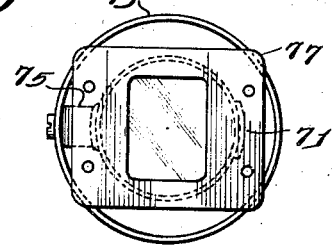
INVENTORS.
Elmer Bradley Offutt.
BY Leonard V. Sorg.
Everett A. Johnson
Attorney.

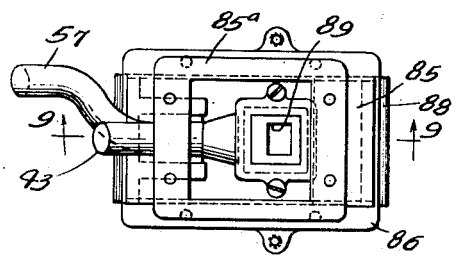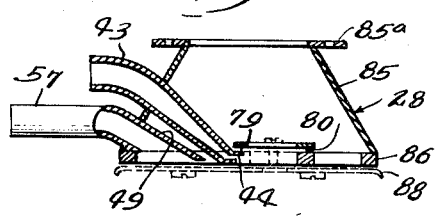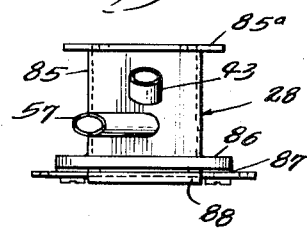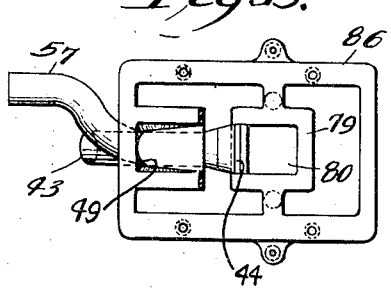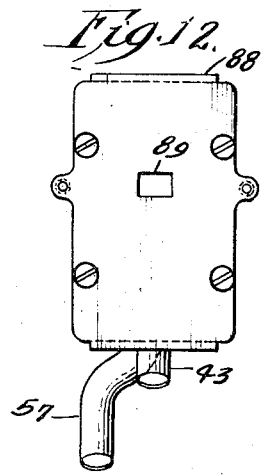

July 23, 1957 E. B. OFFUTT ET AL 2,800,397
METHOD AND APPARATUS FOR ANALYZING A REACTIVE GAS
Filed Aug. 18, 1953 8 Sheets-Sheet 8

PPM H$_2$S IN AIR

INVENTORS:
Elmer Bradley Offutt
BY Leonard V. Sorg.
Everett A. Johnson
Attorney.

2,800,397
METHOD AND APPARATUS FOR ANALYZING A REACTIVE GAS

Elmer Bradley Offutt, Independence, and Leonard V. Sorg, Kansas City, Mo., assignors to Standard Oil Company, Chicago, Ill., a corporation of Indiana Application August 18, 1953, Serial No. 375,032

21 Claims. (Cl. 23—232)

This invention relates to a method and means for the continuous indication and measurement of hydrogen sulfide in an atmosphere.

The presence of hydrogen sulfide always has been associated with the refining of petroleum either as an original component of the crude oil or as a product of the refining operations. The high toxicity of hydrogen sulfide, a concentration of over 25 p. p. m. in air is considered unsafe, requires its detection in minute quantities. Although the obnoxious odor of hydrogen sulfide initially reveals its presence, it is not a reliable means for registering increases in concentration of the gas. In any event, reliable detection in the range of 0–500 p. p. m. is particularly important because this range covers the accepted upper limit for safety purposes. This places an extraordinary requirement on any system of detection to respond reproducibly and with certainty to such minute changes in concentrations.

Heretofore many attempts have been made to devise systems which would automatically and continuously indicate the presence of hydrogen sulfide in air, but such systems have been inadequate either because they do not give a quantitative result, or because they are inaccurate in the presence of oxygen, or because they were not rapidly sensitive to increases in concentration. It is, therefore, an object of this invention to provide a method and means for indicating quantitatively the presence of hydrogen sulfide in an atmosphere which may contain oxygen. Another object is to provide a system which is rapidly sensitive to increases in concentrations of hydrogen sulfide. It is a further object of our invention to provide an apparatus which is simple in operation and of rugged construction. Another object of our invention is to provide a method and means for continuously and automatically analyzing for hydrogen sulfide directly without interference from other common sulfur-bearing contaminants such as mercaptans and sulfur dioxide. A further object is to provide for the continuous and automatic recording the quantity of hydrogen sulfide present in an atmosphere sample. An additional object of our invention is to provide a system for the detection of hydrogen sulfide which does not require the use of solutions in the detecting functions. Another object is to provide a system which is wholly automatic for the continuous detecting, recording and signaling of hydrogen sulfide concentrations without surveillance by an operator. These and other objects of our invention will become apparent as the description thereof proceeds.

Briefly, our invention comprises a sample system, an analyzer system and a recorder system. The sample system consists of two sections, the first section bringing a large sample of hydrogen sulfide-contaminated air from the source location to the analyzer-recorder in a continuous stream. From this stream the second section of the sample system selects a small portion of the total stream which is used for the actual analysis.

The stream of gasiform fluid, such as a sample of air, is saturated with water vapor and applied under precise conditions to a moving transparent tape having a transparent-hydrogen sulfide-sensitive coating or film which darkens in a quantitative manner upon exposure to hydrogen sulfide. Prior to exposure to the sample stream, the film on the tape is pretreated with a stream of humidified air. Means are provided for measuring the extent to which the light transmittancy of the transparent film is reduced as it moves continuously through the exposure chamber. Variations in intensity of a light being transmitted by the exposed tape, which variations are related to the concentration of hydrogen sulfide in an inverse manner, are picked up by a photoelectric cell below the tape. The electrical response from the photoelectric cell is transmitted to a recorder.

The analyzer compartment containing a separate exposure chamber is maintained under controlled temperature conditions and the air within the sealed compartment is circulated so as to maintain the tape and humidifiers also under such uniform temperature conditions. Exhaust means is provided for continuously withdrawing gases from the exposure chamber and thereby prevent their entering into the analyzer compartment.

Further details of our invention are illustrated in the drawings wherein:

Figure 3 is a top view of the components arranged on the mounting panel of Figure 2;

Figure 4 is a section taken along the line 4—4 of Figure 3;

Figure 5 is a right end view of Figure 3;

Figure 6 is a sectional view of the lamp housing assembly of Figure 2;

Figures 7 and 8 represent top and bottom views, respectively, of the lamp housing assembly in Figure 6;

Figure 9 is an elevation in section of the exposure housing assembly;

Figures 10, 11 and 12 are top, end and side views, respectively, of the assembly shown in Figure 9;

Figure 13 is a bottom view of a portion of the assembly in Figure 9 with the housing and the bottom plate of Figure 12 removed;

Figure 14 is an enlarged sectional view showing details of the exposure chamber;

Figure 1:
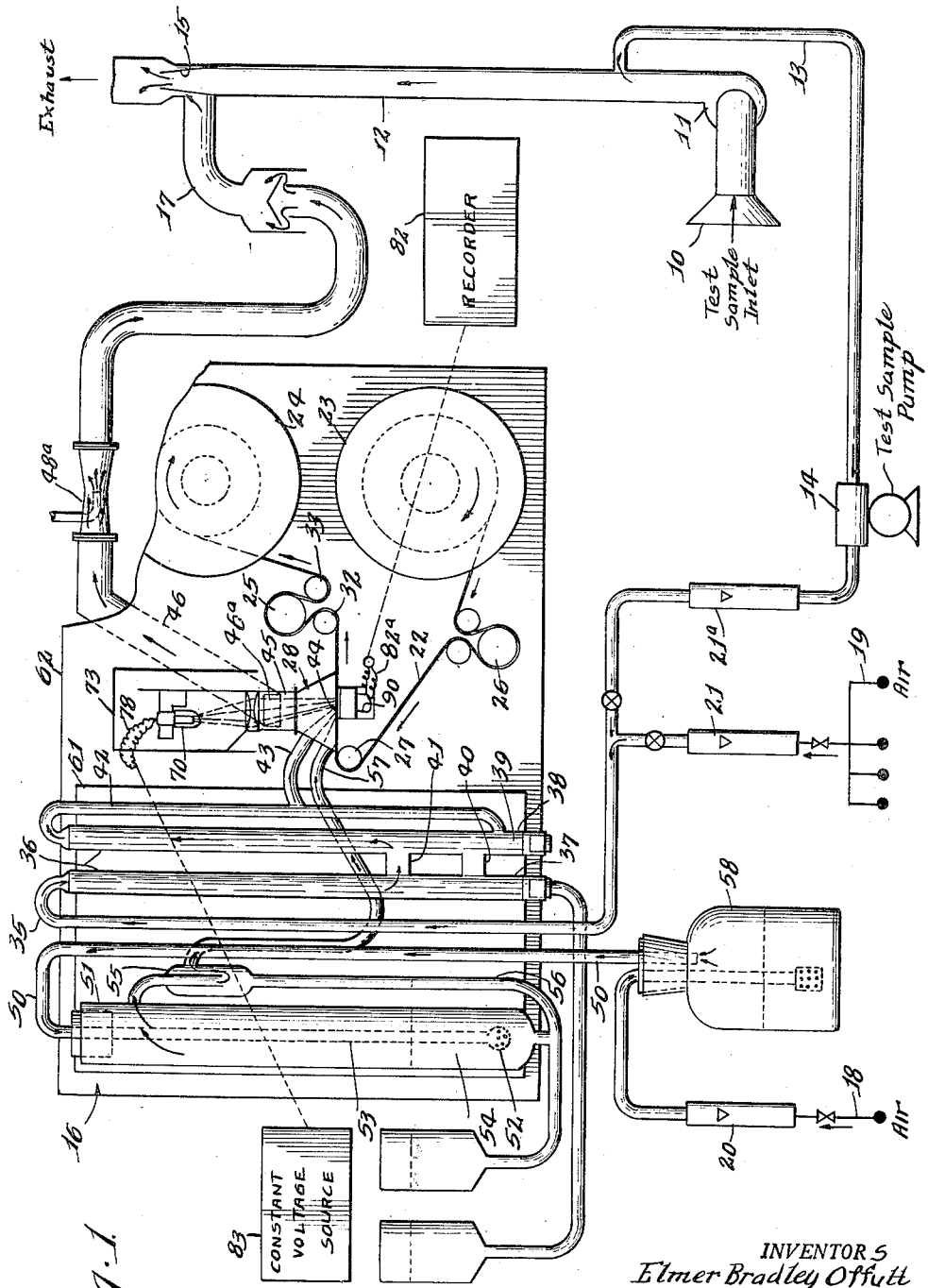
Figure 1 is a schematic illustration of the complete installation employing our apparatus.

Referring to the drawings and in particular to the line diagram of Figure 1, we have illustrated schematically the operating parts of the analyzer and schematically the associated sampling system and exhaust section of the analyzer unit. A large sample of hydrogen sulfide-contaminated air from the source location is introduced through the test sample inlet 10 to blower 11. The blower 11 exhausts through by-pass duct 12 with a minor portion of the flow being diverted through sample line 13 by test sample pump 14. A Venturi restriction 15 in the by-pass duct 12 creates a slight vacuum which enables the exhaust duct 17 to withdraw the analytical sample from the analyzer 16. The instrument, by means of test sample pump 14, picks up a small portion of the total stream which is used for the actual analysis in the determination of the hydrogen sulfide content. The by-pass stream flows at a rate of about 50 to 60 cubic feet per minute whereas the analytical sample stream is of the order of 100 millimeters per minute.

The analytical sample is pumped through the analyzer by means of a variable throughput pump 14. Any variable pump may be used, but in a preferred modification, the sample pump 14 comprises a metal ring pressing a rubber diaphragm into an annular trough in the body of the pump 14. The ring moves through a rotation which is variably angular with respect to an axis normal to the plane of the ring, the ring being driven by a rotating cone. The sample is picked up at one end of the trough, is moved through the trough below the diaphragm, and is exhausted at the other end of the pump by progressive displacement by the rotating ring.

The analyzer system is based upon the reaction of hydrogen sulfide with lead acetate and sodium acetate impregnated in a gelatin coating on the gas-impermeable tape. The tape is prepared externally in equipment designed to apply a three-eighths inch wide band of the sensitized lead acetate to the gelatin coating. In the impregnating step the film passes over a trough containing the impregnated solution of one molar lead acetate and one molar sodium acetate maintained at a pH of 6.7; a band of the reagent is taken up by the coating on the tape; and after drying, the tape is reeled on a suitable reel for installation in the analyzer instrument. The tape is light stable which is an important factor in the use of this instrument.

The specially coated tape 22 is stored on supply reel 23 and used tape is stored on takeup reel 24. The tape 22 is drawn continuously from reel 23 at a constant rate, for example, about 3.375 inches per hour by driven sprocket 25. The tape 22 passes over a tape tension control sprocket assembly 26 and to guide roller 27 before entering the exposure chamber assembly 28. The tape drive sprocket 25 draws the exposed tape 22 from the exposure chamber 28 over guide roller 32 and feeds it over guide roller 33 onto reel 24. The sprocket 25 is driven by a synchronized motor means 29 and the takeup reel 24 is driven through the flexible belt 30 which is coupled to sprocket shaft 31. With a travel of about 3.375 inches per hour a 200 foot reel of tape 22 will last approximately 30 days.

The hydrogen sulfide-laden air sample enters analyzer 16 through preheater tube 35 and passes through a humidity conditioner 36. The humidity conditioner 36 comprises two vertical glass tubes 37 and 38 cross-connected at two levels in a modified H shape. Each such tube contains a wick 39 such as folded adsorptive paper which is kept wetted by water maintained at a desired level in the bottom of the conditioner 36, the water level being the same in each tube because the lower cross tube 40 is beneath the water level.

The air sample passes upward through preheater tube 35 and downwardly in the left tube 37, across through the upper cross-connecting tube 41, and upward through the right tube 38, and then downward through a side arm 42 which serves as an excess water vapor trap-out. The lower end of the side arm 42 is connected to the right tube 38 at a point below the normal water level in the conditioner 36. This renders the air sample saturated with water vapor at the compartment air temperature when it enters the exposure assembly 28 by line 43. The sample passes through the jet 44 from which it impinges against the hydrogen sulfide-sensitive film on the tape 22. The spent air sample is drawn upward into exhaust chamber 45 and passed into an exhaust duct 46 through panel 62 by means of a small centrifugal blower means 48, as shown in Figure 4, or by a modified Venturi or vent 48a as shown in Figure 1.

Just prior to the exposure to the air sample as described above, the tape 22 passes under a small hood 49 (Figure 10) within the exposure chamber 28 where it is humidified by a gas containing a controlled amount of water vapor. As illustrated in Figure 1, the water vapor is carried by an air stream introduced through preheater 50 and passed through the water saturator 51 where the air passes through several holes in a small bulb 52 at the bottom end of the bubbler tube 53 and bubbles through a water pool 54 maintained in the saturator 51.

The air-water saturator 51 controls the humidity conditions of the pre-exposure air-water vapor stream but the main bulk of water is absorbed by the air stream from an auxiliary water-bubbler vessel located outside the analyzer unit. The air from line 18 and rotometer 20 is passed through this auxiliary bubbler unit 58 before it enters the preheater 50 for the saturator 51. The air stream is saturated in the first bubbler 58 at room temperature and as the so-saturated air stream passes through the saturator 51 it picks up only the additional water needed for saturation at the compartment temperature of about 110° F. Inasmuch as the first bubbler unit or air saturator 58 supplies most of the water to the air, it is made large in size, its water level is not critical and can be such that it need be adjusted only infrequently and the water reservoir capacity of the saturator 51 within the analyzer compartment 35 can therefore be of small capacity.

Means are provided on the saturator 51 to prevent excessive water being carried into the exposure chamber assembly 28. Any excess moisture in the air stream is knocked back by separator 55 and discharged into the return 56 which communicates with the bottom of the saturator 51.

Moisture in the air stream from the saturator 51 is supplied by the line 57 to the hood 49 and is absorbed by the film 60 on the tape 22, under the hood 49 in the exposure chamber 28. This preconditions the film 60 just prior to its exposure to the test sample supplied by jet 44.

A stain is formed immediately on the film carried by tape 22 as it passes under jet 44 if the air test sample contains hydrogen sulfide. The optical density of the stain varies as a function of the hydrogen sulfide concentration in the gas sample stream introduced by the jet 44. The stain is a faint tannish color for concentrations of hydrogen sulfide below 5 parts per million. It is a clear brownish color in the approximate range of 5 to 25 parts per million and becomes darker and blacker until it has a coal black appearance for concentrations above about 100 parts per million, becoming nearly opaque in the region of 500 parts per million. The optical density is not linear with hydrogen sulfide concentration. A greater density difference appears for a 5 parts per million change at the 5 to 10 parts per million level than for a 50 parts per million change at the 50 to 100 parts per million level.

The stain intensity can be correlated with the hydrogen sulfide concentration by introducing standard samples of known hydrogen sulfide concentrations by lines 19a and noting the character of the trace on the chart of recorder 82 which is then calibrated in terms of parts per million.

An auxiliary or diluent carrier air stream free of contaminants can be introduced by line 19 and rotometer 21 for admixture with the hydrogen sulfide-laden air sample in line 13. Both the carrier air and the sample stream are metered at definite rates by rotometers 21 and 21a into the analyzer 16. This arrangement permits control of range of concentration for which the instrument may be used as the air-sample ratio may be varied, thus changing the effective range of the instrument; provides a purge medium to sweep the air sample through the instrument lines, thereby reducing any lag in response to changes in the hydrogen sulfide content of the sample stream; provides better "jet" action at the film exposure jet 44 within the exposure chamber 28, thereby assuring more uniform film stains; and compensates for difference in response of the film on successive reels of tape.

To provide an effective full-scale range of 100 parts per million and 200 parts per million hydrogen sulfide the following flow rates are used:

|  | 100 Parts per Million | 200 Parts per Million |
| --- | --- | --- |
| Pre-Exposure moisture air rate _____ l./min__ | 2 | 2 |
| Hydrogen sulfide-air sample rate ____ ml./min__ | 100 | 50 |
| Carrier Air rate _____ ml./min__ | 200 | 250 |

In order to improve the stain characteristics, the temperature of the analyzer compartment 34 of the instrument is maintained at a constant level in the range of 100 and 120° F. In the illustrated embodiment this is done by mounting an electric heater element 61 directly on the instrument panel 62 which may be made of suitable heat conducting and radiating material such as a heavy aluminum sheet. The entire instrument is housed within a section of cabinet 63 such that panel 62 becomes the rear wall of the thermally insulated analyzer compartment 34. The heater element 61 heats the aluminum panel 62 which comprises the rear wall of the compartment 34. Where the ambient temperature is such as to bring the compartment 34 to a temperature above this range, sufficient cooling may be applied to bring the compartment temperature into the range.

Figure 2:
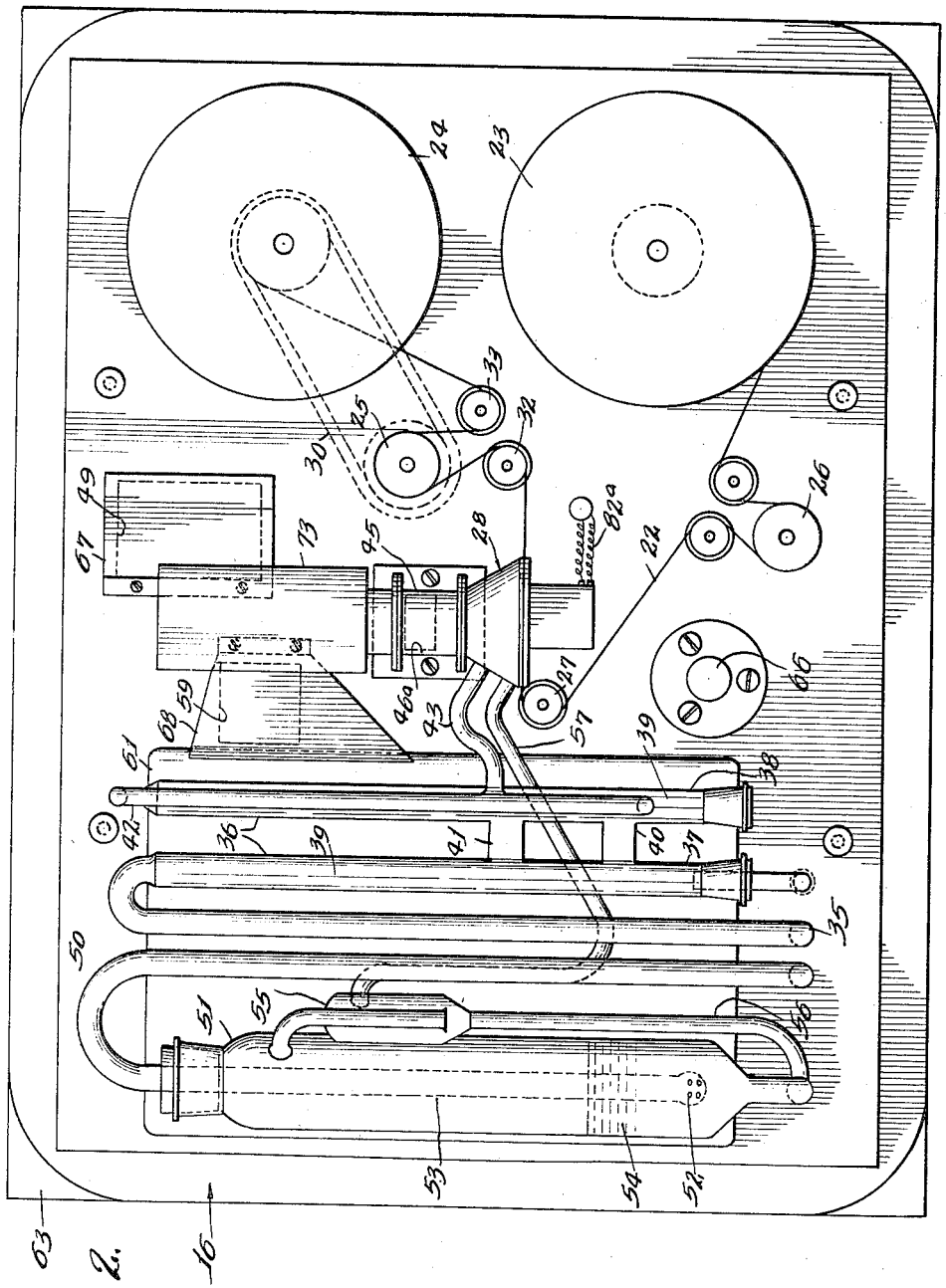
Figure 2 is a detailed elevation illustrating the analyzer compartment of the apparatus.
Figure 15:
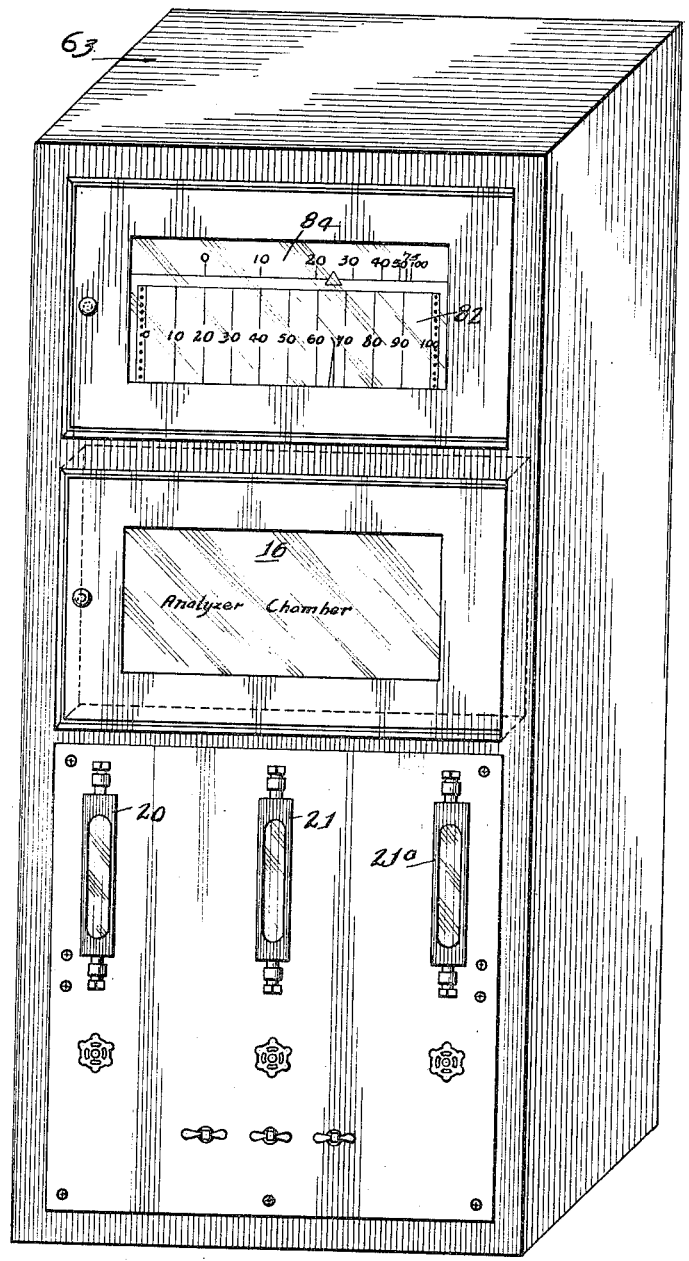
Figure 15 is a perspective view of the apparatus cabinet, including the analyzer compartment and recorder.

Air inside the compartment 34 is circulated by a small centrifugal fan 64 (Figure 3) mounted on the back of panel 62 and driven by an electric motor 65. The deflector hoods 67 and 68 (Figure 2) direct the flow into the inlet 49 and from the outlet 59 of the circulating fan system 64 (Figure 3) onto the humidity conditioner 36, the pre-heater tubes 50 and the water saturator 51. The temperature maintained within the analyzer compartment 34 is controlled by the thermostat 66. Thus, by means of the panel-radiator 62 and the air circulator 64, very uniform temperature is uniquely maintained throughout all parts of the compartment 34.

The optical density of the stain on the film 60 on tape 22 is measured almost simultaneously with its formation. The lamp and housing assembly in Figures 6, 7 and 8 include a lamp 70 adjustably mounted on upright support 71 attached to a sleeve 72 within the housing 73 which is generally of cylindrical configuration and open at both ends. A lens system 74 is supported in the sleeve 72. The housing 73 is mounted on a second upright support 75 attached at its lower end to sleeve 72. A light baffle 76 is fixed below the upper open end of the housing 73. The lower end of the sleeve 72 is supported by an apertured plate 77 adapted to be fixed to the upper end of the exhaust chamber 45. The leads 78 to the lamp 70 are clamped to the bracket 75.

The light from lamp 70 within housing 73 is focused by the lens system 74 to pass through a transparent window 80 adjacent the jet 44, through the underlying tape 22 and the stain on film 60, and onto the active surface of photoelectric cell 81. The photoelectric cell 81 generates a voltage proportional to the light striking its surface and this voltage is recorded by a conventional recording potentiometer 82. The intensity of the light from lamp 70 is held very constant by a voltage-regulating transformer 83. Therefore, the electrical output of photoelectric cell 81 is a function only of the stain density on film 60. Consequently, the scale 84 on the chart of the recording potentiometer 82 may be co-related with the concentration of the hydrogen sulfide in the sample.

The electric impulse from the photoelectric cell 81 is carried to a recorder 82 through a potential dividing circuit so that the position of the record on the chart may be adjusted as required. The recorder may be a conventional model having a range of 0 to 10 millivolts with the maximum scale designation on the left hand side of the chart. The signal from the photoelectric cell 81 is lowest when the hydrogen sulfide concentration is the greatest. Thus, the maximum reading of the hydrogen sulfide concentration on the scale 84 is on the right hand side of the chart. Associated with the recorder 82 is an electrical switching mechanism which can be set to alarm the concentration of hydrogen sulfide at any preselected level. For example, the alarm may sound at 25 p. p. m. of hydrogen sulfide in air indicating the approach of a dangerous concentration in the atmosphere. Thus, a record of hydrogen sulfide concentration is obtained and a warning given when danger is imminent.

An important feature of our invention is the provision of the pre-exposure moisture conditioning hood 49 over the film 60 on tape 22. By means of such moisture conditioning of the film we can stain reproducible film stains for concentrations of hydrogen sulfide over wide ranges and in particular in concentrations above about 25 p. p. m. Without the preconditioning and at concentrations above this level, the stain heretofore abruptly "cuts off" becoming lighter in spots than that obtained for even one p. p. m. concentration.

Referring to Figures 9 to 14, inclusive, the exposure chamber 28 comprises housing walls 85 and frame base 86. An intermediate plate 87 is provided with a tape-receiving recess and is adapted to co-operate with guide plate 88 in guiding the tape 22 through the chamber 28 below the window 80 held in place by cover frame 79. The guide plate 88 has downturned leading and trailing edges for guiding the tape 22 to and from the exposure chamber 28. A jet 44 passes through the housing wall 85 and discharges below the window 80 onto the active coating 60 of the tape 22. The window 80 is immediately downstream from the outlet of the jet 44 and is in alignment with an aperture 89 in the guide plate 88. The preconditioning moisture stream enters the exposure chamber 28 above the tape 22 through conduit 57 and discharges under the hood 49.

Below the chamber 28 is the photoelectric cell 81 adapted to measure the intensity of the stain on the film 60 as described above. The photoelectric cell 81 may be of the General Electric Barrier Layer "self-generating" type. The two terminals 90 of the photoelectric cell 81 may be connected to a suitable potentiometric recorder 82 such as a Brown Electronik Strip-Chart Recorder designed to operate on 10 millivolts full scale. The recorder 82 is adjusted to obtain the desired record scale reading. The intensity of the photoelectric cell lamp must be held constant as mentioned above and of such value as to provide enough energy to the photoelectric cell to operate the recorder 82.

For relatively high $H_2S$ concentration the stain on film 60 is dense, reducing the light striking the photoelectric cell 81, thereby reducing the electrical output from the cell which is fed to the recorder 82. The recorder may contain a switch mechanism which may be adjusted so as to actuate an alarm means (not shown) at any point desired on the scale 84, the scale being in terms of $H_2S$ concentration in p. p. m.

The film 60 is prepared by applying to a uniformly transparent tape 22 a plastic adsorptive coating such as gelatin or agar containing lead acetate and sodium acetate. The tape 22 is of non-reactive, non-porous, non-adsorptive flexible material such as a cellulose acetate tape. The tape 22 is first coated with the gelatin layer and then passed across and in contact with the liquid surface of a solution of the lead acetate and sodium acetate whereby the film is coated with a "track" or band of solution. The coated tape is then dried and after winding on reel 23 the tape is ready for use.

The solution used for coating is one normal lead acetate and one normal sodium acetate and has a pH of about 6.7. The pH is important because if too much acidity exists, film sensitivity to $H_2S$ is decreased. On the other hand, if the acidity is decreased too much, the lead will precipitate from the coating solution with the result that material such as mercaptan will have a greater effect on the standing of the film. Tests have shown that the effect of mercaptan in concentrations normally present in refinery atmospheres is negligible. No appreciable effect is observed for mercaptans present in the air sample at 30 p. p. m. by weight if the film is prepared as described above. The coating obtained from the defined solution produces stains of greater uniformity, greater optical density for a given concentration of $H_2S$ and low susceptibility to variations in optical density when obtaining indications of H₂S in concentrations greater than about 25 p. p. m. Inasmuch as we use a light beam and photoelectric cell to measure the density of the film stain, a light sensitive coating cannot be used. The lead acetate-sodium acetate coating described herein is not light sensitive and retains its transmittancy when exposed to the light beam-photoelectric cell arrangement described herein. Accordingly, the stain obtained on the film 60 is not affected by a change in the transmittancy of the film due to other factors than the presence of H₂S.

A tape similar to 16 mm. movie film base stock may be used in our described system. However, we contemplate a single analyzer assembly, adapted to receive separate streams from several locations, which would detect and record on a multi-band film, and record the concentrations of the individual stains on a conventional multipoint recorder. For example, three separate coating bands may be applied to a broader tape corresponding to a 35 mm. photographic film base and exposed to three separate gas stream either in a multiple jet hood or three separate hoods and recording on a single strip chart so that three separate records appear each in a different color. Likewise, different chemical constituents in the same gas sample can be detected, analyzed, and recorded simultaneously by providing each separate constituent with a separate coating band on film 60 applied to the base transparent tape 22.

The analyzer is able to detect the presence of one p. p. m. of hydrogen sulfide in air. This was done reproducibly in the range of from 1 to about 25 p. p. m. of hydrogen sulfide in air. In the range of about 25 to 50 p. p. m. the reproducibility was in the order of 2 p. p. m. Above this range and up to about 100 p. p. m. the reproducibility was about 5 p. p. m.

Figure 16:
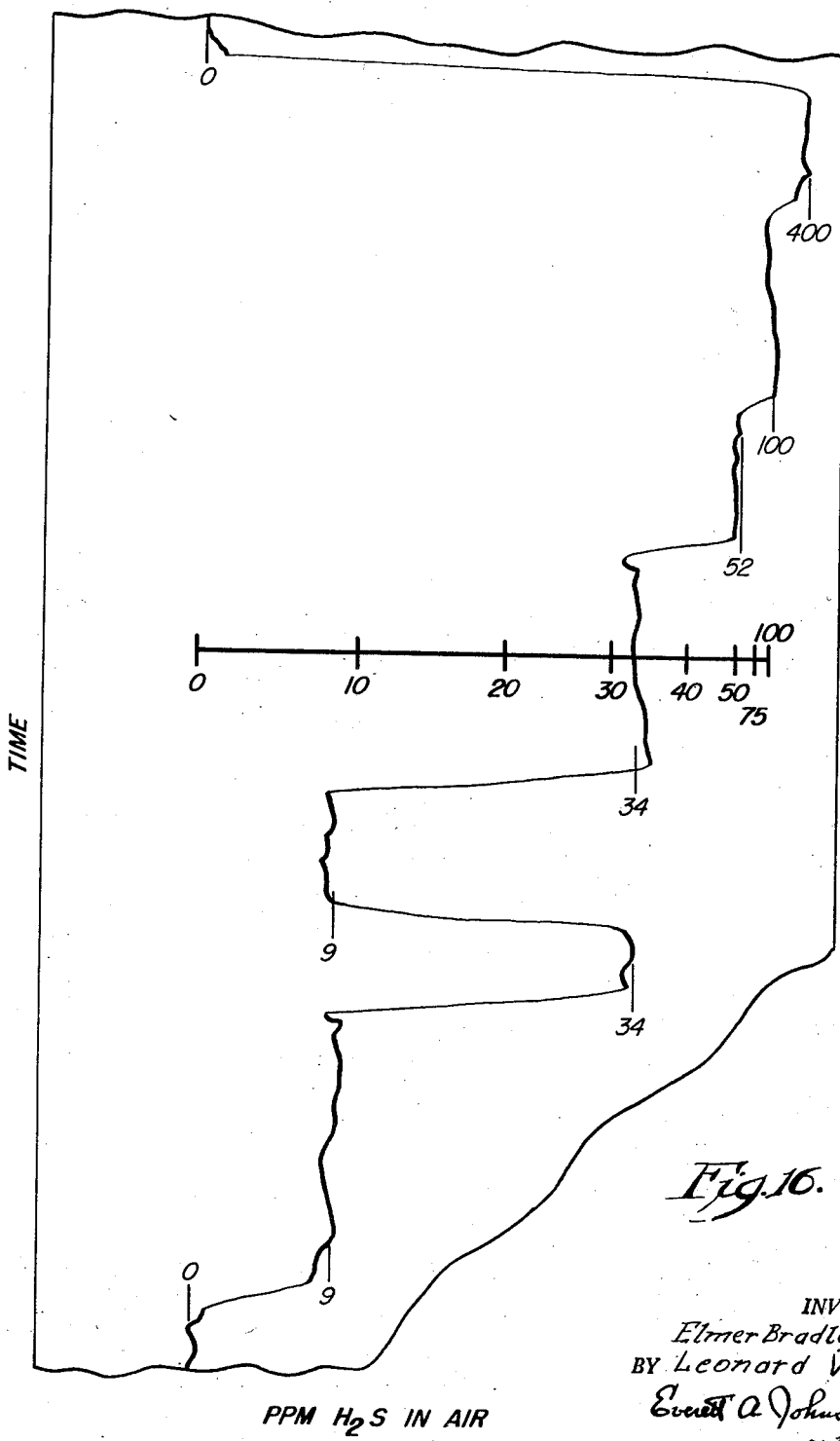
Figure 16 is a chart illustrating the instrumental response and reproducibility.

In Figure 16 of the drawings we have illustrated a typical chart obtainable with known hydrogen sulfide concentrations in air test samples. This chart also illustrates the response and degree of reproducibility that may be expected from the instrument, three runs having been repeated at separate intervals.

The detection range of 0 to 500 p. p. m. described above has been determined from test work on H₂S samples made up to known concentrations under pressure and then released at controlled rates through the analyzer instrument. The 500 p. p. m. concentration approaches the upper limit for direct detection because the optical density of the exposure film is very great at this level. However, this is not the practical limit for H₂S detection and we have measured H₂S concentrations as high as 2000 p. p. m. by dilution of the influent sample stream from line 57 by adjusting measured quantities of carrier air supplied by line 19 prior to exposure. By controlling the dilution ratio to bring any sample stream into the H₂S concentration range of 0 to 500 p. p. m. this instrument can serve as an analyzer-recorder-controller by high concentrations of H₂S admixed with an inert gas. For example, we may automatically control sulfur production by combustion of H₂S in an atmosphere limited in oxygen concentration.

Our instrument has many advantages, including the fact that it is free from errors associated with other atmospheric contaminants normally found around a refinery. For example, mercaptans, sulfur dioxide and sulfur trioxide in concentrations normally found in the refinery atmosphere do not appear to have any adverse effect. Another advantage of our instrument and technique is that our design permits measurement of the optical density of the film stain directly following its formation thereby giving an immediate, visible, continuous, and permanent record of H₂S concentration. Our film is not light-sensitive and we provide a direct reading system in a unitary apparatus. Thus, by our system it is possible to use photoelectric measurement of the optical transmittancy of a stain formed on a continuously moving transparent tape and the necessity for developing a light-sensitive film prior to scanning is avoided. We provide a constant temperature in the analyzer compartment 34 by means of the electrical heater 61, the heat from which is radiated in a unique manner by means of the radiation panel 62.

The speed with which the instrument responds to change in hydrogen sulfide is related to the volume of the instrument's sample system. With a large volume of air continuously flowing by the sample inlet port 10, it has been demonstrated that on an ascending change in hydrogen sulfide concentration, the instrument gives evidence of that change in about 30 to 45 seconds depending upon the magnitude of the change. If the change is from a low volume of hydrogen sulfide concentration to a very high volume, the evidence of change may be noted in as little as 25 seconds. Thus, the instrument responds rapidly to sudden increases in hydrogen sulfide concentration.

Ordinarily, the ambient temperature will be sufficiently low to require heating of the analyzer chamber to maintain the desired temperature and humidity therein. However, where the ambient temperature is higher than the preferred range we may cool the analyzer compartment or provide additional moisture. For example, cooling can be applied to the exposure assembly 28 below the tape 22 as it passes under the hood 49. This can be done by affixing a small heat exchanger block below the tape to cool it as it passes under the hood 49. This heat exchanger block is then maintained at a temperataure below the compartment temperature by circulating through openings in the block a cooling fluid such as water.

The presence of moisture is essential to facilitate film stain formation upon exposure to hydrogen sulfide and it is desirable to maintain the film above a moisture level. This may be accomplished by humidifying the air circulated within the analyzer compartment.

When operation of the instrument is in areas where the ambient temperature is high and the moisture content of the film is lower than desired, it is also contemplated that moist air can be directed onto the tape on the supply reel by the circulating fan system. In other words, the circulating fan system ordinarily discharges on the air saturating apparatus as illustrated in the drawings. On the other hand, if it is desired to increase the moisture content of the film the circulating fan system may be reversed so as to cause moist air to impinge upon the tape reels. To provide the moist air Pitot tubes may extend within a Venturi section of the circulating fan system and connect to a liquid water supply. When the air is passed through the circulating system in one direction, no moisture is added to the air whereas when it flows in the opposite direction moisture is injected into the air flow by the Pitot tube assembly.

Although our invention has been described in connection with the detection and recording of H₂S on a continuously moving film, the invention is not limited to H₂S. The essential factor is a reactant wherein optical density is related reproducibly to concentration, and other gases on which this instrument can be applied include sulfur dioxide, sulfur trioxide, and the like. Thus, with the proper choice of film coating or coatings, and photoelectric cells, our analyzer can be made to detect, record and control any gas-phase process.

We also contemplate that the tape 22 may be provided with a multiplicity of bands 60 for the detection and recording of hydrogen sulfide contamination of the atmosphere at several sampling points. Likewise, the bands might be separately reactive to different types of contamination gases so that a single sample may give indication of more than one type of contamination.

Our system may also be used in an exploratory manner. This can be done by providing a portable sample inlet 10, preferably a flexible conduit communicating with the blower 11. Such a portable inlet 10 can be used to probe pieces of equipment which are suspected of discharging hydrogen sulfide into the larger sampling area in which an increase of hydrogen sulfide has been indicated.

From the description herein it will be apparent that we have attained the objects of our invention and have provided a method and means for the continuous and accurate measurement and recording of H2S concentrations. However, the detailed description of a preferred embodiment of our invention is intended as an illustration only and, accordingly, it is contemplated that changes and modifications can be made in the described system without departing from the scope of the invention.

What we claim is:

1. The analytical method which comprises moving a reactive film comprising a plastic coating on one surface of a light-transmitting and gas-impervious tape through a test zone, directing a beam of light of constant intensity through said reactive film on said tape while said film and tape are moving through said zone, humidifying said film before it intercepts said light beam, contacting the surface of said humidified film with a controlled amount of a reactive test gas sample before said film has passed through said light beam, and detecting the change in the light transmittancy of said reactive film as an indication of the proportion of the reactive gas component in the test gas sample.

2. The analytical method of claim 1 wherein the test gas sample is an air stream containing hydrogen sulfide as the reactive gas component and wherein the said reactive film contains lead acetate and sodium acetate.

3. The analytical method of claim 2 wherein an air stream of controlled humidity pretreats the said plastic coating, the test sample stream is humidified before it impinges on said coating, and wherein both streams of humidified air and humidified test sample are maintained at a constant elevated temperature.

4. The analytical method of claim 3 which includes prediluting the test gas sample stream with a controlled amount of gasiform diluent which is free from said reactive gas component.

5. In an apparatus for measuring the concentration of a chemically reactive gas in a gasiform fluid stream wherein a moving tape is exposed to the reactive gases and the extent of change in the light transmittancy of such tape is measured as an indication of the concentration of reactive gases, the improvement which comprises a clear non-adsorptive gas-impermeable tape, a reactive coating on said tape, an exposure chamber through which said tape is caused to travel, a light source directing a beam of light through said exposure chamber and through said tape, a photoelectric cell means exposed to the light beam transmitted through said tape, means for saturating a first gasiform fluid stream with water vapor, means for pretreating said tape by directing said first stream onto said tape within said exposure chamber, a jet inlet means for directing a stream of gasiform fluids containing reactive gases onto said pretreated tape before said tape travels through said light beam, and indicating means actuated by said photoelectric cell means in response to changes in the light transmittancy of said tape after exposure to said reactive gases.

6. In an apparatus for measuring the concentration of a chemically reactive gas in a gasiform fluid stream wherein a moving tape is exposed to the gasiform fluid stream and the extent of discoloration of such tape is measured as an indication of the concentration of reactive gas, the improvement which comprises an optically clear non-adsorptive tape of initially high light transmittancy, a clear plastic coating on only one surface of said tape, said coating carrying a substance reactive with said gas to form a colored reaction product, an exposure chamber through which said tape is caused to travel, a light source directing a beam of light through said exposure chamber and through said tape, a photoelectric cell means exposed to the light beam transmitted through said tape, means for saturating a first gasiform fluid stream with water vapor, means for directing said first stream onto said tape, a jet inlet means for directing a second stream of gasiform fluids containing reactive gases onto said tape within said exposure chamber, and indicating means actuated by said photoelectric cell means in response to changes in the light transmittancy of said tape after exposure to said reactive gases.

7. In an apparatus for detecting the concentration of hydrogen sulfide in a gasiform fluid stream the improvement which comprises an exposure chamber, a gas impervious light stable transparent tape, a coating on said tape specifically sensitive to hydrogen sulfide and comprising a mixture of lead acetate and sodium acetate, means for moving said tape through said exposure chamber at a uniform rate, heating means for maintaining said exposure chamber and tape at a uniform temperature, means for pretreating said tape within said exposure chamber with a stream of air saturated with water vapor, jet means in said chamber for directing a stream of gasiform fluids on said treated tape, a light source directing a beam of light through said exposure chamber and through said exposed tape, a photoelectric means in the path of the beam of light transmitted through said moving tape, and indicator means actuated by said photoelectric means for recording changes in the light transmittancy of said tape due to exposure to the said gasiform fluids.

8. An apparatus capable of detecting and recording the concentration of hydrogen sulfide in a gas stream in the presence of mercaptans comprising an enclosed cabinet, a metal panel in said cabinet, means for heating said panel by conduction whereby said cabinet is heated by radiation from said panel, a gas-impervious light transmitting strip movably arranged within said cabinet, a hydrogen sulfide reactive coating on said strip, a first reel having a length of unexposed strip thereon, a take-up reel means to receive exposed strip, an exposure housing enclosing a portion of the strip between said first reel and said take-up reel, a first hood discharging into said housing and directing moisture-laden air onto unexposed strip passing therethrough, a jet discharging into said housing and onto the portion of said strip which has been pretreated by said moisture-laden air, a window adjacent said jet and overlying the path of travel of said strip, a light source positioned over said window and directing a beam of light through said window and through said strip, a photoelectric cell means disposed below said strip in optical alignment with said light source and said window, and indicating means controlled by said photoelectric cell means.

9. A unitary apparatus for detecting and recording quantitatively the presence of hydrogen sulfide in a sample gas stream which comprises an exposure chamber, a strip of gas-impermeable tape movable through said exposure chamber, a surface coating on said tape which is reactive to hydrogen sulfide to produce a discoloration thereof and thereby substantially reducing the light transmittancy of the said strip, a light source positioned to direct a beam of light normal to the travel of said strip through said exposure chamber, a hood discharging moisture-laden air onto the surface coating of said strip within said exposure chamber, a jet means directing a sample gas stream onto the surface coating on said strip within said exposure chamber following the pretreatment thereof by said moisture-laden air, take-up reel means for drawing said strip through said exposure chamber, a photoelectric cell means disposed below said strip and positioned in the path of the light beam transmitted from said source through said strip, and indicating means controlled by said photoelectric cell means in response to discoloration of said surface coating on said moving strip.

10. In an apparatus for detecting the concentration of hydrogen sulfide in a gasiform fluid stream the improvement which comprises an exposure chamber, a transparent non-adsorptive tape extending through said exposure chamber, said tape having a plastic adsorptive coating thereon which has been treated with a one normal solution of sodium acetate and of lead acetate maintained at a pH of about 6.7, means for maintaining said exposure chamber and tape at a uniform temperature, means for drawing said tape through said chamber at a uniform rate, means for pretreating said coating with a stream of gas saturated with water vapor, means for directing a stream of a gasiform fluid onto said pretreated coating within said exposure chamber, a light source directing a beam of light through said exposed tape, a photoelectric-responsive means in the path of the beam of light transmitted through said exposed tape, and indicator means actuated by said photoelectric-responsive means for recording changes in the light transmittancy of the said tape due to discoloration of the tape coating upon exposure to the said gasiform fluids.

11. A unitary apparatus for detecting and recording the presence of hydrogen sulfide in a gas stream which comprises a movable light transmitting film strip, a coating on said film strip which is reactive to hydrogen sulfide to produce discoloration therein to reduce the light transmittancy of the said film strip, said coating being disposed on only one surface of said tape and comprising a mixture of lead acetate and sodium acetate supported by a gelatin emulsion, an exposure chamber through which said strip travels, a light source positioned to direct a beam of light transversely to the direction of travel of said film strip through said exposure chamber, a first hood discharging moisture-laden air onto said film within said exposure chamber, a jet means directing a sample gas stream onto said coating within said exposure chamber following the treatment of the coating by said moisture-laden air, take-up reel means for drawing said strip through said exposure chamber, a photoelectric cell means disposed below said strip in the path of the light beam transmitted from said source through said strip, said photoelectric cell means being responsive to changes in the light transmittancy of said coating on said moving strip, and indicating means responsive to said photoelectric cell means.

12. A temperature controlled apparatus for detecting and indicating the concentration of hydrogen sulfide in a gasiform fluid stream which comprises in combination an enclosed cabinet, a panel in said cabinet dividing said cabinet into first and second sections, a movable gas-impervious transparent tape, a reactive coating on one surface only of said tape, tape reel means carried by said panel and adapted to cause said tape to travel at a uniform rate, an exposure chamber means mounted on said panel in the path of travel of said tape and enclosing a portion thereof, a light source directing a beam of light through said exposure chamber and through said tape as said tape passes through said exposure chamber, a photoelectric cell means in the path of the light beam transmitted through said tape, an air saturator means mounted on said panel, a conduit and hood means discharging saturated air from said saturator means onto said moving tape within said exposure chamber before it travels across the path of said light beam, a jet inlet directing a stream of gasiform fluids containing reactive gases intermediate said hood and the path of said light beam whereby reactive gases act on said reactive coating to cause a discoloration thereof and thereby reduce the light transmittancy properties of the tape, an electrical means for heating said panel by conduction, an air circulating means within said cabinet, a thermostatic heater control means in said cabinet, a gas exhaust means communicating with said exposure chamber and discharging exterior of said cabinet, and recording potentiometer means actuated by said photoelectric cell means for indicating the degree of change in the light transmitting properties of the traveling tape upon exposure to said gasiform fluids containing reactive gases.

13. An apparatus for measuring the concentration of a chemically reactive gas including hydrogen sulfide in a flowing gasiform fluid stream which comprises in combination an enclosed and heat-insulated cabinet, an exposure chamber within said cabinet, a transparent gas-impervious strip having a reactive coating upon one side only, means for drawing said strip through said exposure chamber at a uniform rate, guide means in said exposure chamber adapted to guide said strip in its travel through said exposure chamber, a window in said guide means exposing said coated strip to a light beam, a light source directing said beam of light through said window and through said strip, a photoelectric cell means below said guide means and in optical alignment with said light source and window, a jet inlet means for directing a gasiform fluid stream containing reactive gas onto said strip before it passes below said window, a hood means discharging into said exposure chamber adjacent the surface of the moving strip for directing a stream of moisture-laden air onto said strip before it is contacted by the said gasiform fluid stream, air saturation means for saturating an air stream with water vapor at the temperature within said cabinet, a panel in said cabinet supporting the aforementioned elements, means for heating said panel by conduction whereby it radiates heat, an air circulation means within said cabinet, a thermostat means for controlling the temperature therein, and a recording potentiometer means connected to the output of said photoelectric cell means for indicating quantitatively the concentration of reactive gases in said gasiform fluid stream.

14. An analytical apparatus which comprises light source means directing a light beam of constant intensity through a transparent reactive coating carried by a light-transmitting tape support, said support being gas-impervious, photoelectric cell means in the path of said light beam and located on the opposite side of said tape support from the said source means, means for continuously moving said supported coating to intercept said light beam, means for adding moisture to said coating before it intercepts said light beam, said coating being reactive with a reactive gas component of a test gas sample in the presence of added moisture, means for impinging a controlled flow of such test gas sample on the said moistened coating before it passes beyond said light beam, and means controlled by the output of said photoelectric cell means for indicating the proportion of reactive gas component in the test gas sample.

15. The apparatus of claim 14 wherein the test gas sample is an air stream containing hydrogen sulfide as the reactive gas component and wherein the coating comprises an absorptive plastic coating containing lead acetate and sodium acetate in about equimolar amounts.

16. The apparatus of claim 14 wherein said means for adding moisture to the film includes means for impinging an air stream of controlled humidity against said coating and means whereby the test gas sample stream of controlled humidity impinges against said coating immediately prior to interception of the light beam.

17. The apparatus of claim 16 which includes means for maintaining the air stream of controlled humidity and the test gas sample stream of controlled humidity at a constant temperature.

18. The apparatus of claim 14 which includes means for diluting the test gas sample stream with a controlled amount of air which is free from said reactive gas component.

19. An apparatus for analyzing for the presence of hydrogen sulfide in gases which includes a hydrogen sulfide reactive film comprising a plastic coating upon one surface only of a light-transmitting and gas-impervious tape, means for moving said tape through a test chamber, means for directing a beam of light of constant intensity through said reactive film on said tape while said film and tape are moving through said chamber, means for humidifying said film before it intercepts said light beam, means for contacting the surface of said humidified film with a controlled amount of a test gas sample before said film has passed through said light beam, and means for detecting change in the light transmittancy of said reactive film on said tape as an indication of the proportion of hydrogen sulfide in the test gas sample.

20. The apparatus of claim 12 wherein the reactive coating on said tape consists essentially of lead acetate and sodium acetate adsorbed into a gelatin emulsion carried by said gas-impervious transparent tape.

21. A reactive film carried by a tape and adapted for detecting quantitatively varying concentrations of $H_2S$ in gasiform fluids which comprises a gas-impervious transparent tape support, a gelatin emulsion coating on one surface only of such transparent tape support, and reactive components adsorbed into said coating, the reactive components consisting essentially of lead acetate and sodium acetate in equimolar amounts.

References Cited in the file of this patent

UNITED STATES PATENTS

| | | |
|---|---|---|
| 2,113,063 | Stryker et al. | Apr. 5, 1938 |
| 2,232,622 | Moses et al. | Feb. 18, 1941 |
| 2,345,090 | Brace | Mar. 28, 1944 |
| 2,551,281 | Moses et al. | May 1, 1951 |
| 2,554,414 | McClendon | May 22, 1951 |
| 2,567,445 | Parker | Sept. 11, 1951 |
| 2,589,116 | Nolcken | Mar. 11, 1952 |
| 2,602,729 | Curry | July 8, 1952 |
| 2,622,015 | Cooper et al. | Dec. 16, 1952 |
| 2,639,418 | Sundstrom et al. | May 19, 1953 |
| 2,741,544 | Chaikin et al. | Apr. 10, 1956 |